US012777191B2

(12) United States Patent
Chen et al.

(10) Patent No.: US 12,777,191 B2
(45) Date of Patent: Oct. 27, 2026

(54) ENHANCED PRESENTATION OF TILES OF RESIDUAL SUB-LAYERS IN LOW COMPLEXITY ENHANCEMENT VIDEO CODING ENCODED BITSTREAM

(71) Applicant: Intel Corporation, Santa Clara, CA (US)

(72) Inventors: Xiaomin Chen, Shanghai (CN); Renzhi Jiang, Shanghai (CN); Jing Li, Shanghai (CN); Hongbo Lv, Shanghai (CN); Hua Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 18/841,954

(22) PCT Filed: Mar. 30, 2022

(86) PCT No.: PCT/CN2022/083964

§ 371 (c)(1),
(2) Date: Aug. 27, 2024

(87) PCT Pub. No.: WO2023/184206

PCT Pub. Date: Oct. 5, 2023

(65) Prior Publication Data

US 2025/0175648 A1 May 29, 2025

(51) Int. Cl.
*H04N 19/70* (2014.01)
*H04N 19/184* (2014.01)

(52) U.S. Cl.
CPC ........... *H04N 19/70* (2014.11); *H04N 19/184* (2014.11)

(58) Field of Classification Search
CPC ........ H04N 19/18; H04N 19/33; H04N 19/42; H04N 19/46; H04N 19/48; H04N 19/60;
(Continued)

(56) References Cited

U.S. PATENT DOCUMENTS 11,089,334 B1 8/2021 Bhattacharyya et al.
2022/0272342 A1 * 8/2022 Meardi ................ H04N 19/124
(Continued)

FOREIGN PATENT DOCUMENTS

CN 103369314 A 10/2013
CN 113727113 A 11/2021
(Continued)

OTHER PUBLICATIONS

International Searching Authority, "International Preliminary Report on Patentability," issued in connection with International Patent Application No. PCT/CN2022/083964, mailed on Sep. 24, 2024, 5 pages.
(Continued)

*Primary Examiner* — Peet Dhillon

(74) *Attorney, Agent, or Firm* — Hanley, Flight & Zimmerman, LLC

(57) ABSTRACT

This disclosure describes systems, methods, and devices related to enhanced low complexity enhancement video coding (LCEVC) presentation of tiles. A device may encode video data into one or more bits while applying an LCEVC organizational syntax. The device may generate a bitstream of the one or more bits based on the LCEVC organizational syntax. The device may assign a payload type value to the bitstream, wherein the payload type value indicates the LCEVC organizational syntax has been applied to the one or more bits. The device may transmit the bitstream to a device comprising a decoder.

20 Claims, 6 Drawing Sheets

(58) Field of Classification Search
CPC ........ H04N 19/70; H04N 19/91; H04N 19/93; H04N 19/107; H04N 19/124; H04N 19/136; H04N 19/176; H04N 19/186; H04N 19/503
See application file for complete search history.

(56) References Cited

U.S. PATENT DOCUMENTS

| | | | | |
|---|---|---|---|---|
| 2022/0345753 | A1* | 10/2022 | Ferrara | H04N 19/86 |
| 2022/0400270 | A1* | 12/2022 | Meardi | H04N 19/136 |
| 2024/0155132 | A1* | 5/2024 | Maurer | H04N 19/117 |

FOREIGN PATENT DOCUMENTS

| | | | |
|---|---|---|---|
| WO | 2013005371 | A1 | 1/2013 |
| WO | 2022023739 | A1 | 2/2022 |

OTHER PUBLICATIONS

International Searching Authority, “Written Opinion,” issued in connection with International Application No. PCT/CN2022/083964, mailed on Dec. 30, 2022, 4 pages.
International Searching Authority, “International Search Report,” issued in connection with International Application No. PCT/CN2022/083964, mailed on Dec. 30, 2022, 3 pages.

* cited by examiner

ENHANCED PRESENTATION OF TILES OF RESIDUAL SUB-LAYERS IN LOW COMPLEXITY ENHANCEMENT VIDEO CODING ENCODED BITSTREAM

RELATED APPLICATION(S)

This application corresponds to the U.S. national phase of International Patent Application No. PCT/CN2022/083964, which was filed on Mar. 30, 2022. Priority to International Patent Application No. PCT/CN2022/083964 is claimed. International Patent Application No. PCT/CN2022/083964 is incorporated herein by reference in its entirety.

TECHNICAL FIELD

This disclosure generally relates to systems and methods for wireless communications and, more particularly, to an enhanced presentation of tiles of residual sub-layers in low complexity enhancement video coding encoded bitstream.

BACKGROUND

Video coding can be a lossy process that sometimes results in reduced quality when compared to original source video. Video coding standards are being developed to improve video quality.

Figure 1:
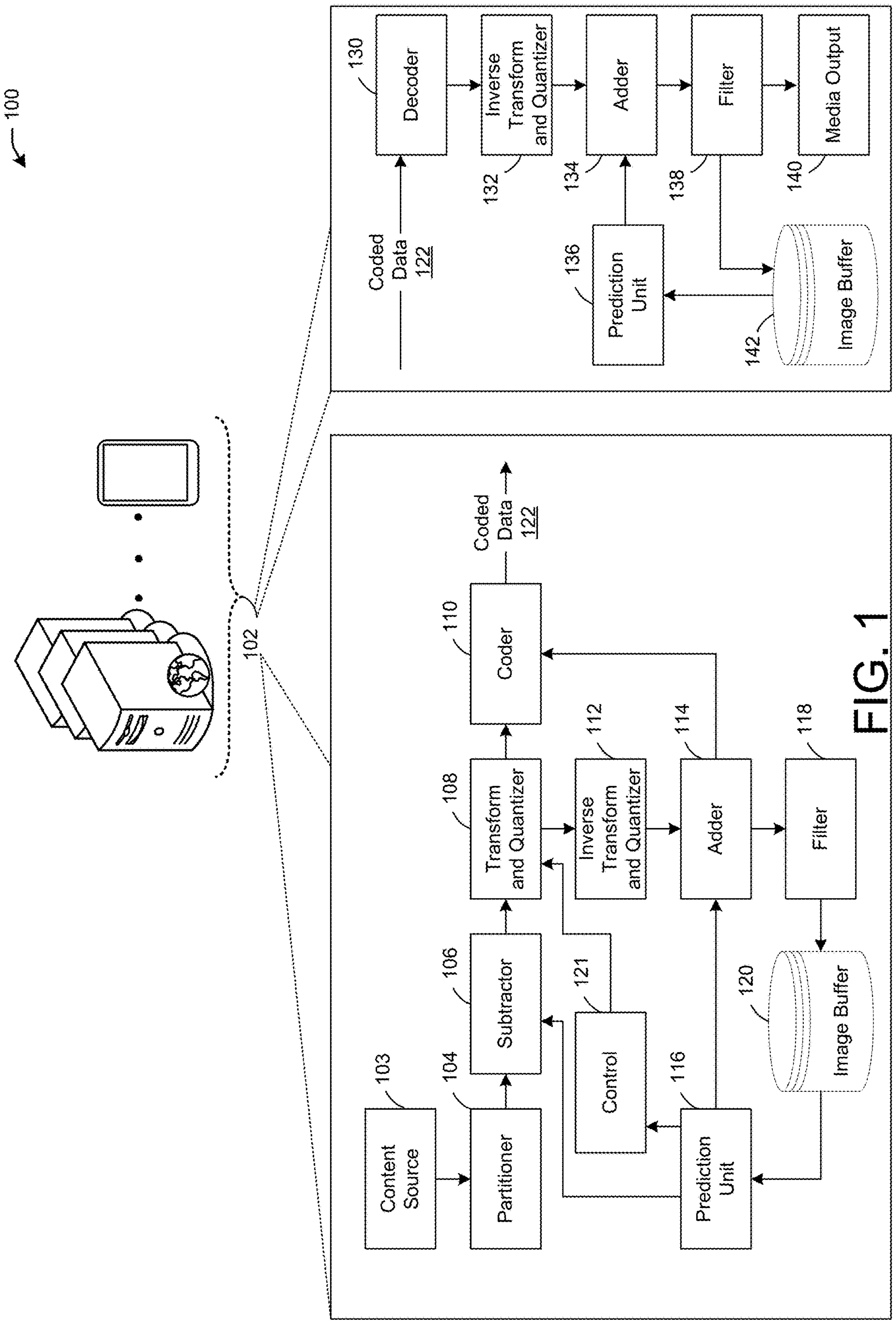
FIG. 1 depicts an example system illustrating components of encoding and decoding devices, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Low complexity enhancement video coding (LCEVC) works by encoding a lower resolution version of a source image using any existing codec (the base codec) and the difference between the reconstructed lower resolution image and the source using a different compression method (the enhancement). LCEVC is an enhancement codec, meaning that it does not just up-sample well: it will also encode the residual information necessary for true fidelity to the source and compress it (transforming, quantizing and coding it). LCEVC is not convenient for extracting tile-based encoded bits for usage situations such as immersive video encoding for larger resolution.

LCEVC residual layers (enhancement sub-layers) encode the residual information necessary for true fidelity to the source and compress it (transforming, quantizing and coding it). LCEVC can be used in higher resolutions or higher frame rates (e.g., 4 Kp60, 8K, 12K) video supports motion constrained tile set (MCTS) since there is no motion-related computing in residual information encoding. With all these benefits, LCEVC is a best choice used for immersive video, such as high resolution (8K/12K) 360 video, multi-view video, light-field video, and so on. Tile-level bitstream access and operations (division or aggregation) are required most of the time which is caused by viewport change.

Example embodiments of the present disclosure relate to systems, methods, and devices for presenting tiles of residual sub-layers in LCEVC encoded bitstream.

Video is composed of many frames. Each frame is considered to be a picture. Tiles are divisions of the picture into different portions/sections.

In one or more embodiments, an enhanced LCEVC presentation of tiles system may introduce a mechanism to organize tile-based encoded bits in LCEVC and facilitate a new structure for the bitstream of the encoded bits. Having a tile-based video is important in many applications. LCEVC is a new codec, where tiles are currently organized based on each plane (Y, U, or V). Y/U/V formats have three planes: Y, U, and V, where Y is the Luma plane and can be seen as the image as grayscale, and U and V are referred to as the Chroma planes, which are basically the colors. All the Y/U/V formats have these three planes and differ by the different orderings.

In one or more embodiments, an enhanced LCEVC presentation of tiles system may define new syntax structure for tile as the alternative of current tile data organization in LCEVC bitstream.

In one or more embodiments, an enhanced LCEVC presentation of tiles system may facilitate that the new syntax structure for tile will organize the data firstly on the base of enhancement sub-layer, rather than Y/U/V planes, and tile encoded data on one enhancement sub-layer stores consecutively. As a result, the data for different tiles and different enhancement sub-layers can be easily distinguished.

In one or more embodiments, an enhanced LCEVC presentation of tiles system may make LCEVC more fit to immersive video delivery (360 video, multi-view video, light-field video, etc.) which is becoming more and more important in the video streaming industry.

In one or more embodiments, MPEG-5 Part 2 LCEVC is a new video coding standard that was published in 2020, driven by several commercial needs by many leading industry experts from various areas of the video delivery chain. It can leverage existing and future codecs to enhance their performances whilst reducing their computational complexity, which can reduce the cost of changing codecs. The new syntax structure for tile is just for data organization, rather than the encoding process. So, there will be no increase in encoded data size and encoding complexity.

In one or more embodiments, an enhanced LCEVC presentation of tiles system may facilitate that the new syntax structure for tile in LCEVC can make this new high-efficient video coding standard be adopted in viewport-dependent tile-based immersive video delivery more easily and then make the delivery solution available and reliable for live streaming of much larger resolutions, like 12K/16K.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 depicts an example system 100 illustrating components of encoding and decoding devices, according to some example embodiments of the present disclosure.

Referring to FIG. 1, the system 100 may include devices 102 having encoder and/or decoder components. As shown, the devices 102 may include a content source 103 that provides video and/or audio content (e.g., a camera or other image capture device, stored images/video, etc.). The content source 103 may provide media (e.g., video and/or audio) to a partitioner 104, which may prepare frames of the content for encoding. A subtractor 106 may generate a residual as explained further herein. A transform and quantizer 108 may generate and quantize transform units to facilitate encoding by a coder 110 (e.g., entropy coder). Transform and quantized data may be inversely transformed and inversely quantized by an inverse transform and quantizer 112. An adder 114 may compare the inversely transformed and inversely quantized data to a prediction block generated by a prediction unit 116, resulting in reconstructed frames. A filter 118 (e.g., in-loop filter for resizing/cropping, color conversion, de-interlacing, composition/blending, etc.) may revise the reconstructed frames from the adder 114, and may store the reconstructed frames in an image buffer 120 for use by the prediction unit 116. A control 121 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 116. Using the encoding aspects, the transform and quantizer 108 may generate and quantize transform units to facilitate encoding by the coder 110, which may generate coded data 122 that may be transmitted (e.g., an encoded bitstream).

Still referring to FIG. 1, the devices 102 may receive coded data (e.g., the coded data 122) in a bitstream, and a decoder 130 may decode the coded data, extracting quantized residual coefficients and context data. An inverse transform and quantizer 132 may reconstruct pixel data based on the quantized residual coefficients and context data. An adder 134 may add the residual pixel data to a predicted block generated by a prediction unit 136. A filter 138 may filter the resulting data from the adder 134. The filtered data may be output by a media output 140, and also may be stored as reconstructed frames in an image buffer 142 for use by the prediction unit 136.

Referring to FIG. 1, the system 100 performs the methods of intra prediction disclosed herein, and is arranged to perform at least one or more of the implementations described herein including intra block copying. In various implementations, the system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 100 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 100 and/or other systems, schemes or processes may be described herein, the present disclosure is not necessarily always limited to any particular video coding standard or specification or extensions thereof.

As used herein, the term “coder” may refer to an encoder and/or a decoder. Similarly, as used herein, the term “coding” may refer to encoding via an encoder and/or decoding via a decoder. A coder, encoder, or decoder may have components of both an encoder and decoder. An encoder may have a decoder loop as described below.

For example, the system 100 may be an encoder where current video information in the form of data related to a sequence of video frames may be received to be compressed. By one form, a video sequence (e.g., from the content source 103) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 104 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 100 may receive an input frame from the content source 103. The input frames may be frames sufficiently pre-processed for encoding.

The system 100 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 308 may be provided to the inverse transform and quantizer 112 to generate the same reference or reconstructed blocks, frames, or other units as would be generated at a decoder such as decoder 130. Thus, the prediction unit 116 may use the inverse transform and quantizer 112, adder 114, and filter 118 to reconstruct the frames.

The prediction unit 116 may perform inter-prediction including motion estimation and motion compensation, intra-prediction according to the description herein, and/or a combined inter-intra prediction. The prediction unit 116 may select the best prediction mode (including intra-modes) for a particular block, typically based on bit-cost and other factors. The prediction unit 116 may select an intra-prediction and/or inter-prediction mode when multiple such modes of each may be available. The prediction output of the prediction unit 116 in the form of a prediction block may be provided both to the subtractor 106 to generate a residual, and in the decoding loop to the adder 114 to add the prediction to the reconstructed residual from the inverse transform to reconstruct a frame.

The partitioner 104 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 116 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 116 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 116 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 106 from the current block of original image data, and the resulting residual may be partitioned into one or more transform blocks (TUs) so that the transform and quantizer 108 can transform the divided residual data into transform coefficients using discrete cosine transform (DCT) for example. Using the quantization parameter (QP) set by the system 100, the transform and quantizer 108 then uses lossy resampling or quantization on the coefficients. The frames and residuals along with supporting or context data block size and intra displacement vectors and so forth may be entropy encoded by the coder 110 and transmitted to decoders.

In one or more embodiments, a system 100 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 100 may process the bitstream with an entropy decoder 130 to extract the quantized residual coefficients as well as the context data. The system 100 then may use the inverse transform and quantizer 132 to reconstruct the residual pixel data.

The system 100 then may use an adder 134 (along with assemblers not shown) to add the residual to a predicted block. The system 100 also may decode the resulting data using a decoding technique employed depending on the coding mode indicated in syntax of the bitstream, and either a first path including a prediction unit 136 or a second path that includes a filter 138. The prediction unit 136 performs intra-prediction by using reference block sizes and the intra displacement or motion vectors extracted from the bitstream, and previously established at the encoder. The prediction unit 136 may utilize reconstructed frames as well as inter-prediction motion vectors from the bitstream to reconstruct a predicted block. The prediction unit 136 may set the correct prediction mode for each block, where the prediction mode may be extracted and decompressed from the compressed bitstream.

In one or more embodiments, the coded data 122 may include both video and audio data. In this manner, the system 100 may encode and decode both audio and video.

It is understood that the above descriptions are for purposes of illustration and are not meant to be limiting.

Figure 2:
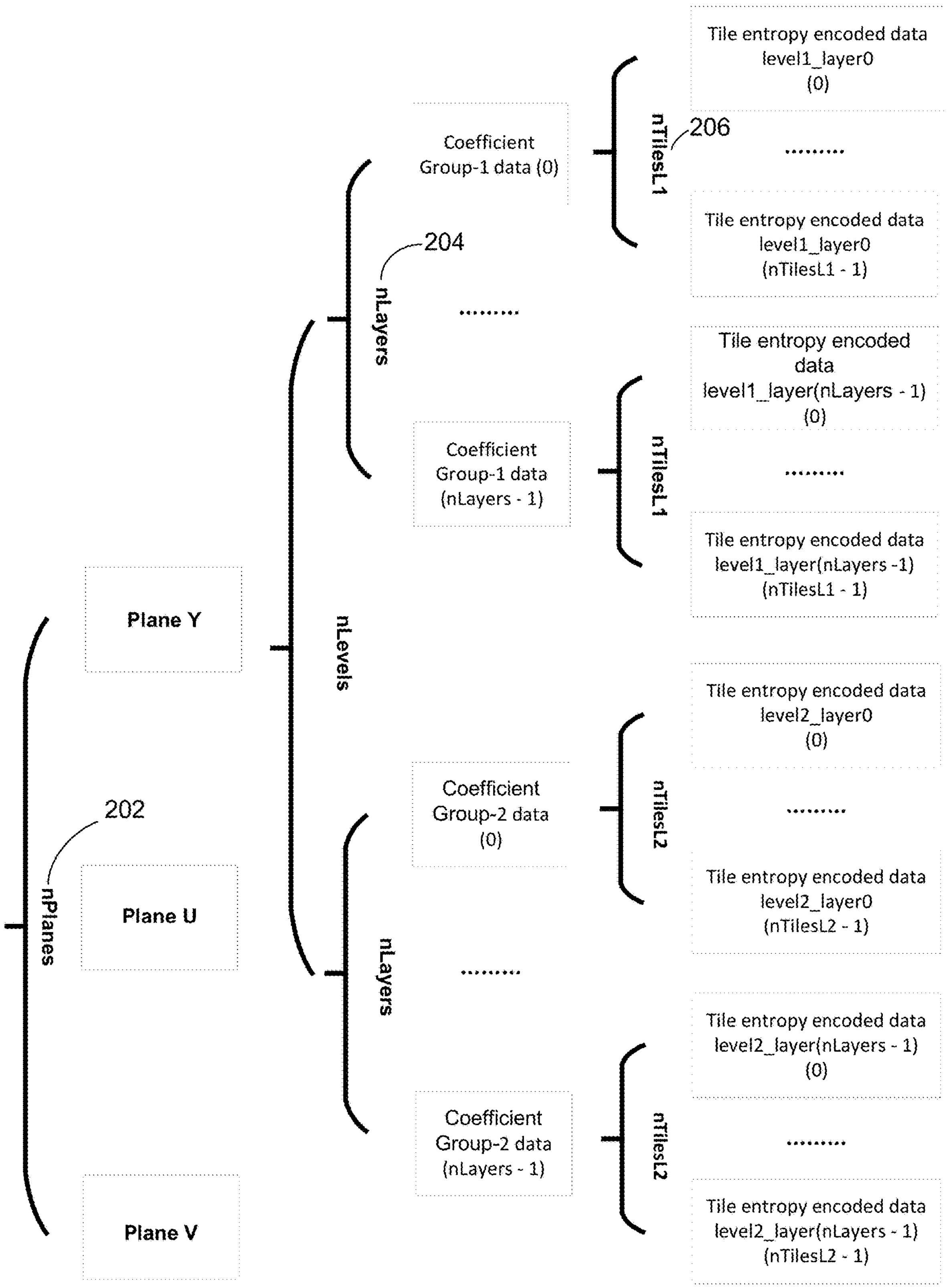
FIG. 2 depicts an illustrative schematic diagram for the current low complexity enhancement video coding (LCEVC) presentation of tiles, in accordance with one or more example embodiments of the present disclosure.

FIG. 2 depicts an illustrative schematic diagram for the current LCEVC presentation of tiles, in accordance with one or more example embodiments of the present disclosure.

Referring to FIG. 2, there is shown LCEVC bitstream data structure of encoded tiles. For example, FIG. 2 shows that bits are first organized by plane (e.g., planes 202). On each plane, the bits are separated into residual layers (e.g., levels 204). On each layer, the bits are organized based on transformation coefficients, wherein each transformation coefficient is then grouped/separated based on tiles 206.

In current LCEVC, the encoded data for the tile of residual layers are organized as in FIG. 2. From the Figure, encoded data for the same tile is dispersed in the current bitstream, locating on different planes (Y/U/V), different residual layers, and different coefficient groups; it is hard to divide the whole picture into the different tiles at the bitstream level when re-packing the stream, for example, using DASH to stream the tiled video complied with omnidirectional media format (OMAF).

In one or more embodiments, an enhanced LCEVC presentation of tiles system may facilitate a novel way to encode and organize the tile in LCEVC bitstream to make it fit such usage.

Figure 3:
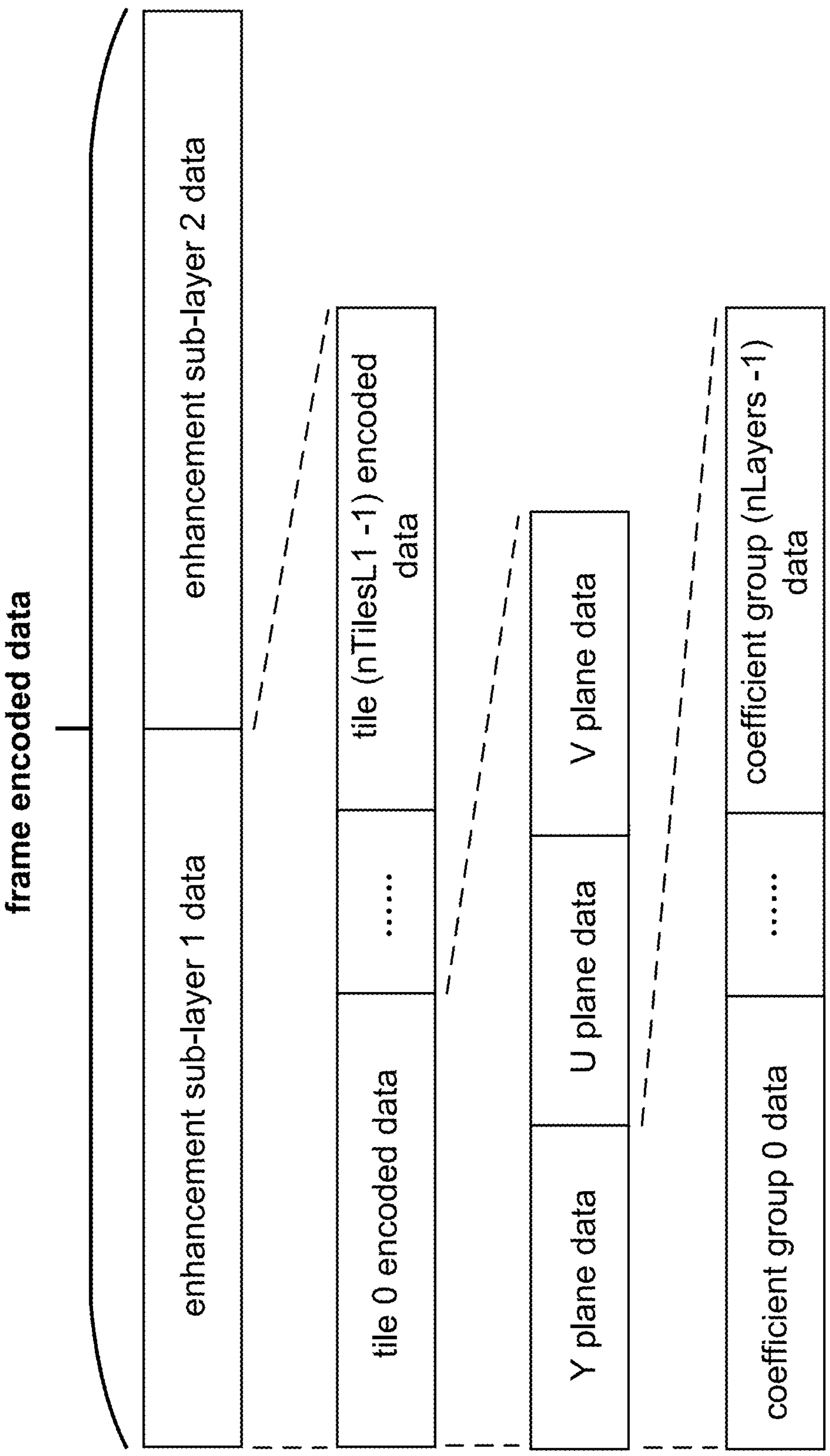
FIG. 3 depicts an illustrative schematic diagram for LCEVC presentation of tiles, in accordance with one or more example embodiments of the present disclosure.

FIG. 3 depicts an illustrative schematic diagram for an enhanced LCEVC presentation of tiles system, in accordance with one or more example embodiments of the present disclosure. In one or more embodiments, an enhanced LCEVC presentation of tiles system may change the LCEVC bitstream structure. Especially, the enhanced LCEVC presentation of tiles system is detectable by parsing LCEVC bitstream. If the tile encoded data is organized in the form of the hierarchy shown in FIG. 3, then the enhanced LCEVC presentation of the tiles system is detected.

As described above, the proposed syntax for tile does not change the encoding process but defines a new data organization structure. In addition, the new syntax is not the replacement of existing tile data syntax but serves as an alternative to it.

Figure 4:
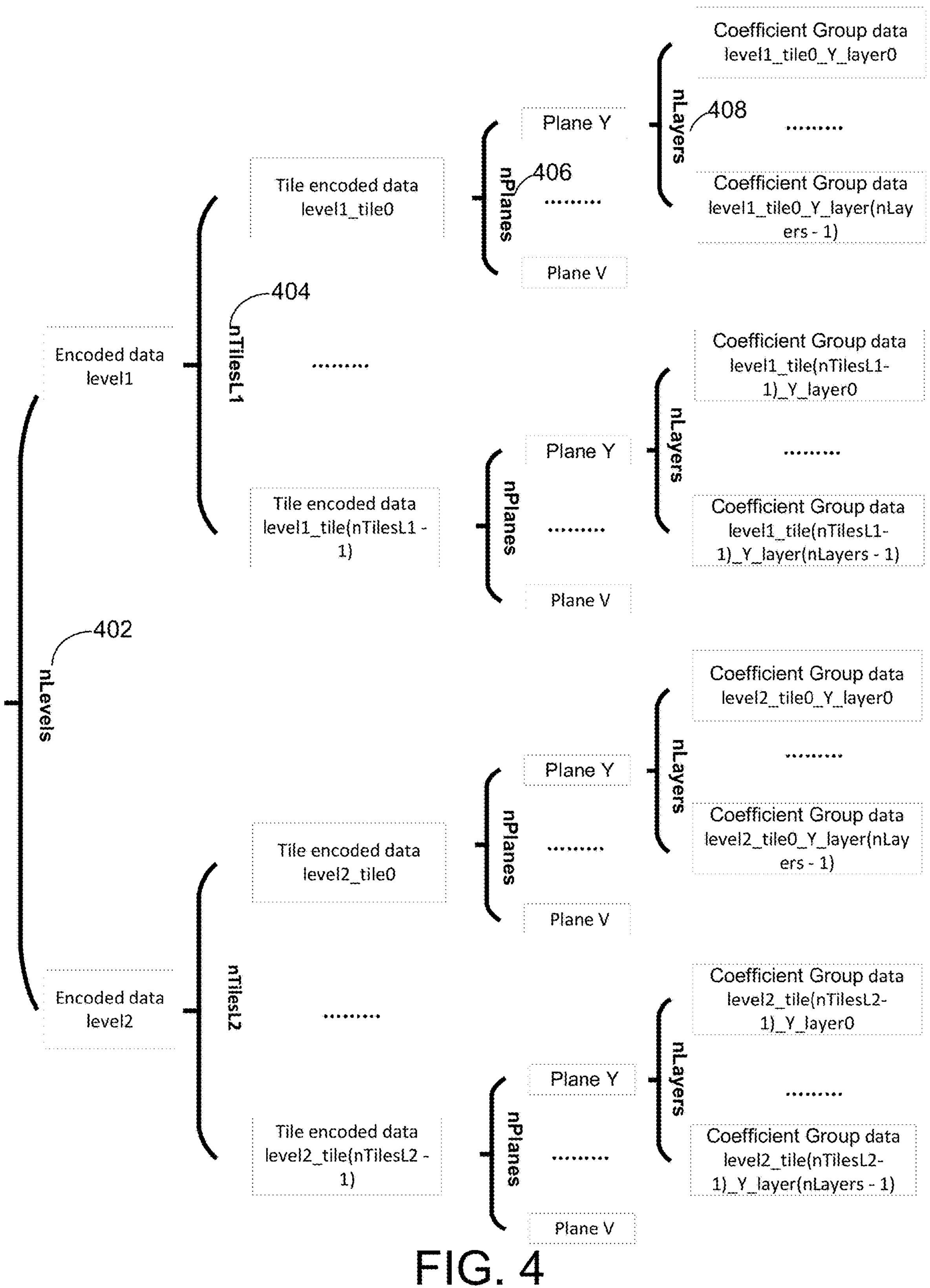
FIG. 4 depicts an illustrative schematic diagram for enhanced LCEVC presentation of tiles, in accordance with one or more example embodiments of the present disclosure.

FIG. 4 depicts an illustrative schematic diagram for an enhanced LCEVC presentation of tiles system, in accordance with one or more example embodiments of the present disclosure.

Referring to FIG. 4, there is shown a proposed LCEVC bitstream data structure for tile. The encoded bits are organized based on encoded data levels (e.g., levels 402). That is, an enhanced LCEVC presentation of tiles system may facilitate organizing tiles 404 on the first level than those bits are organized on a second residual level. On the first residual level, the encoded bits are separated into a group and each group is based on the tile. Then in each group based on the tile, the encoded bits are organized into three planes (e.g., planes 406). Finally, on each plane, the bits are organized into transformation coefficients on various layers 408.

Based on current process block syntax in LCEVC, new payload 'process_payload_subpic_encoded_data( )' shown in Table 1, is defined as the proposed tile syntax, in which 'sub pic' equates to 'tile' and is used to distinguish with existing tile data syntax 'process_payload_encoded_data_tiled( )'. In addition, a new payload size type and payload type need to be added to correspond to this new payload, which is shown in Table 2 and Table 3.

TABLE 1

New added payload 'process_payload_subpic_encoded_data( )' in process_block syntax.

| Syntax | Descriptor |
|---|---|
| process_block( ) { | |
| payload_size_type | u(3) |
| payload_type | u(5) |
| payload_size = 0 | |
| if (payload_size_type == 7) { | |
| custom_byte_size | mb |
| payload_size = custom_byte_size | |
| } else { | |
| if (payload_size_type == 0) payload_size = 0 | |
| . . . | |
| if (payload_size_type == 6) payload_size = 6 | |
| } | |
| if (payload_type == 0) | |
| process_payload_sequence_config(payload_size) | |
| . . . | |
| else if (payload_type == 4) | |
| process_payload_encoded_data_tiled(payload_size) | |
| . . . | |
| else if (payload_type == 7) | |
| process_payload_subpic_encoded_data(payload_size) | |
| } | |

TABLE 2

New added payload size type

⟹

| payload_size_type | Size (bytes) |
|---|---|
| 6 | Reserved |
| 6 | 6 |

TABLE 3

New added payload type

| payload_type | Content of payload | Minimum frequency | ⟹ | payload_type | Content of payload | Minimum frequency |
|---|---|---|---|---|---|---|
| 7-30 | Reserved | | | 7 | process_payload_subpic_encoded_data( ) | picture |
| | | | | 8-30 | Reserved | |

In Table 2, value 6 for syntax element 'payload_size_type' which is reserved originally, now is used to correspond to proposed tile syntax. And in Table 3, value 7 for syntax element 'payload_type' now is used to denote new content payload 'process_payload_subpic_encoded_data( )'.

Then, the detailed syntax for new payload 'process_payload_subpic_encoded_data( )' is listed in Table 4.

TABLE 4

Process payload - subpic encoded data

| Syntax | Descriptor |
|---|---|
| process_payload_subpic_encoded_data(payload_size) { | |
| for (levelIdx = 1; levelIdx <= 2; levelIdx++) { | |
| if (levelIdx == 1) | |
| nTiles = nTilesL1 | |
| else | |
| nTiles = nTilesL2 | |
| for (tileIdx = 0; tileIdx < nTiles; tileIdx++) { | |
| for (planeIdx = 0; planeIdx < nPlanes; planeIdx++) { | |
| if (no_enhancement_bit_flag == 0) { | |
| for (layerIdx = 0; layerIdx < nLayers;layerIdx++) { | |
| surfaces [levelIdx].tiles [tileIdx].[planeIdx][layerIdx].rle_only_flag | u(1) |
| } | |
| } | |
| if (temporal_signalling_present_flag == 1) | |
| temporal_surfaces [levelIdx].tiles[tileIdx].[planeIdx].rle_only_flag | u(1) |
| } // end of planeIdx | |
| byte_alignment( ) | |
| if (compression_type_entropy_enabled_per_tile_flag == 0) { | |
| for (planeIdx = 0; planeIdx < nPlanes; planeIdx++) { | |
| if (no_enhancement_bit_flag == 0) { | |
| for (layerIdx = 0; layerIdx < nLayers; layerIdx++) { | |
| surfaces[levelIdx].tiles[tileIdx].[planeIdx][layerIdx].entropy_enabled_flag | u(1) |
| } //end of layerIdx | |
| } | |
| if (temporal_signalling_present_flag == 1) { | |
| if (levelIdx == 2) { | |
| temporal_surfaces[levelIdx].tiles[tileIdx].[planeIdx].entropy_enabled_flag | u(1) |
| } | |
| } | |
| } // end of planeIdx | |
| } else { | |
| entropy_enabled_per_tile_compressed_data_rle | mb |
| } | |
| byte_alignment( ) | |
| if (compression_type_size_per_tile == 0) { | |
| for (planeIdx = 0; planeIdx < nPlanes; planeIdx++) { | |
| for (layerIdx = 0; layerIdx < nLayers; layerIdx++) { | |
| process_surface(surfaces[levelIdx].tiles[tileIdx].[planeIdx][layerIdx]) | |
| } | |
| if (temporal_signalling_present_flag == 1) { | |
| if (levelIdx == 2) { | |
| process_surface(temporal_surfaces[levelIdx].tiles[tileIdx].[planeIdx]) | |
| } | |
| } | |
| } // end of planeIdx | |
| } else { | |
| for (planeIdx = 0; planeIdx < nPlanes; planeIdx++) { | |
| for (layerIdx = 0; layerIdx < nLayers; layerIdx++) { | |
| if(surfaces [levelIdx].tiles[tileIdx].[planeIdx][layerIdx].rle_only_flag) { | |
| compressed_size_per_tile_prefix | mb |
| } else { | |
| compressed_prefix_last_symbol_bit_offset_per_tile_prefix | mb |
| compressed_size_per_tile_prefix | mb |
| } | |
| process_surface(surfaces[levelIdx].tiles[tileIdx].[planeIdx] [layerIdx]) | |
| } //end of layerIdx | |
| if (temporal_signalling_present_flag == 1) { | |
| if(temporal_surfaces [levelIdx].tiles[tileIdx].[planeIdx].rle_only_flag) { | |
| compressed_size_per_tile_prefix | mb |
| } else { | |
| compressed_prefix_last_symbol_bit_offset_per_tile_prefix | mb |
| compressed_size_per_tile_prefix | mb |
| } | |
| if (levelIdx == 2) { | |
| process_surface(temporal_surfaces[levelIdx].tiles[tileIdx].[planeIdx]) | |
| } | |
| } | |

TABLE 4-continued

| Process payload - subpic encoded data | |
|---|---|
| Syntax | Descriptor |
| } // end of planeIdx | |
| } | |
| } // end of tileIdx | |
| } // end of levelIdx | |
| } | |

Furthermore, the data organization structure corresponding to the proposed tile syntax is depicted in FIG. 4.

When tile encoded data is organized in the above form, it will be easy to abstract the whole data of one tile in one enhancement sub-layer, which makes LCEVC feasible to be adopted in tile-based video delivery chain, like viewport-dependent tile-based immersive video delivery.

It is understood that the above descriptions are for purposes of illustration and are not meant to be limiting.

Figure 5:
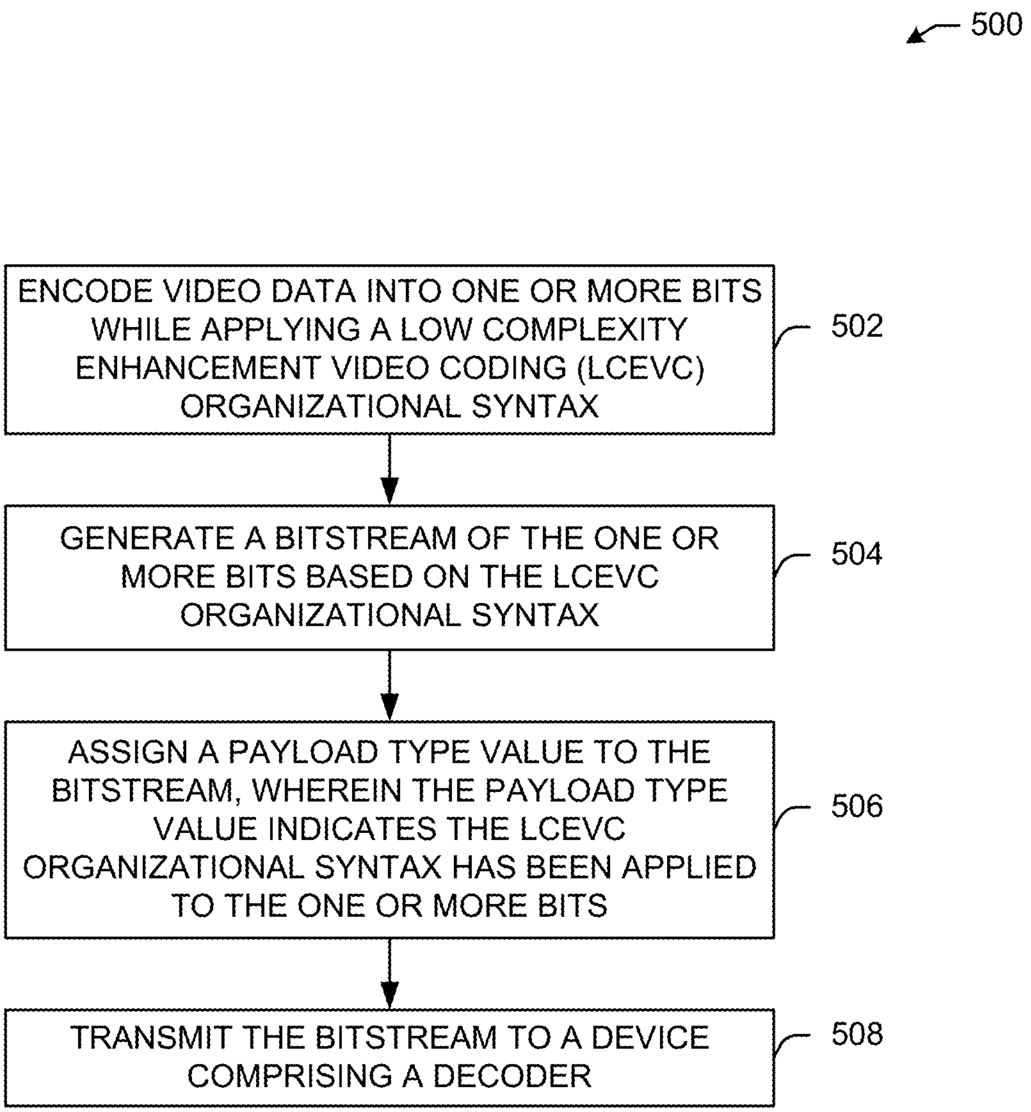
FIG. 5 illustrates a flow diagram of a process for an illustrative enhanced LCEVC presentation of tiles system, in accordance with one or more example embodiments of the present disclosure.

FIG. 5 illustrates a flow diagram of a process 500 for an enhanced LCEVC presentation of tiles system, in accordance with one or more example embodiments of the present disclosure.

At block 502, a device (e.g., the enhanced LCEVC presentation of tiles device of FIG. 1 and/or the enhanced LCEVC presentation of tiles device 619 of FIG. 6) may encode video data into one or more bits while applying a low complexity enhancement video coding (LCEVC) organizational syntax. The LCEVC organizational syntax is applied to frame rates of 4 Kp60, 8K, or 12K. The LCEVC organizational syntax is based on a tile index of a video frame. The LCEVC organizational syntax results in tile data of a video frame to be accessed without being based on Y/U/V planes. The payload type value indicates to decoder of the device that the bitstream is associated with the LCEVC organizational syntax. The tile data comprises Y/U/V planes data. The bitstream is comprised of a first enhancement sublayer data that comprises a plurality of tile encoded data, wherein each tile encoded data comprises data associated with Y plane data, U plane data, and V plane data. Each plane data comprises coefficient group data.

At block 504, the device may generate a bitstream of one or more bits based on the LCEVC organizational syntax.

At block 506, the device may assign a payload type value to the bitstream, wherein the payload type value indicates the LCEVC organizational syntax has been applied to one or more bits.

At block 508, the device may transmit the bitstream to a device comprising a decoder.

It is understood that the above descriptions are for purposes of illustration and are not meant to be limiting.

Figure 6:
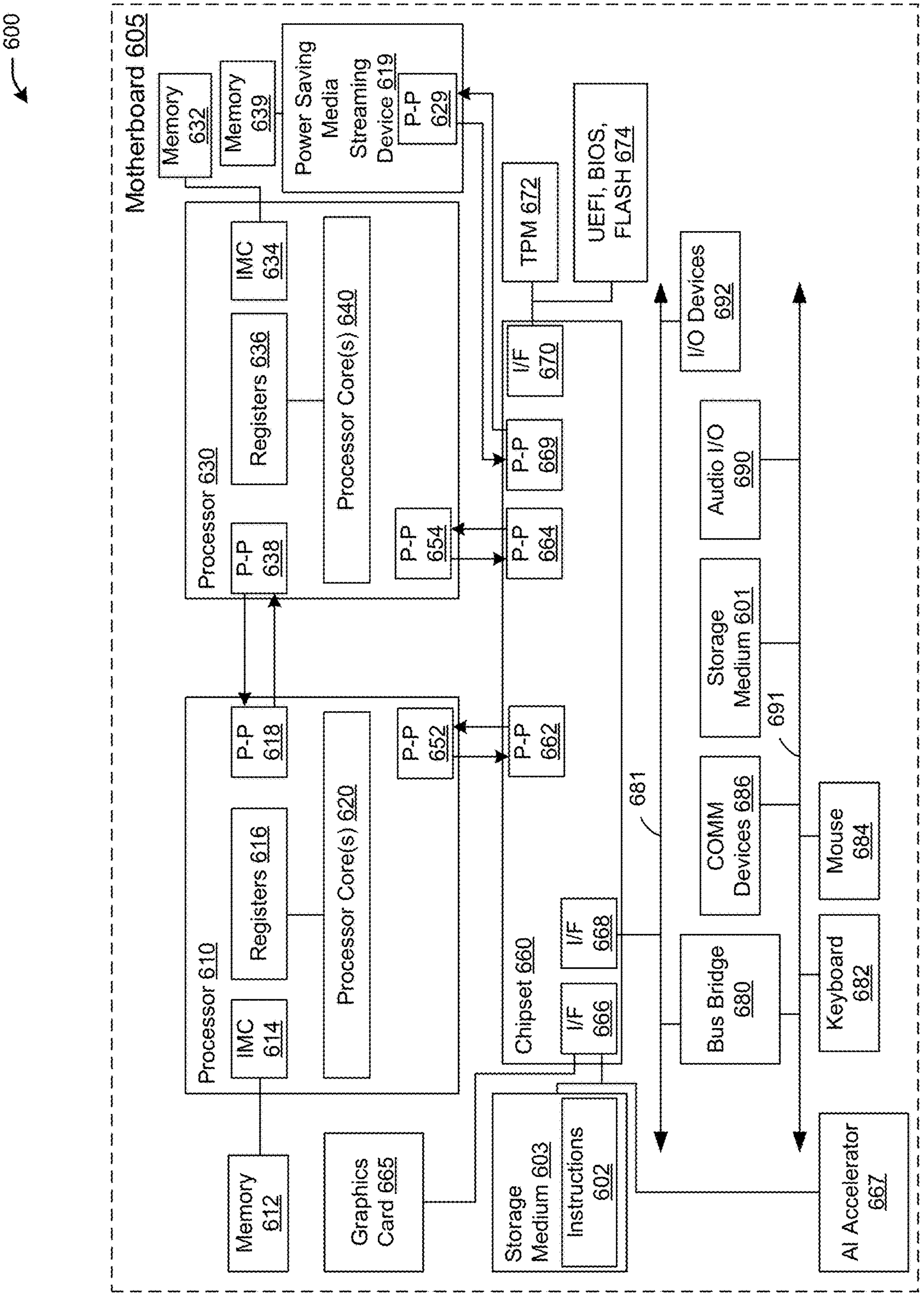
FIG. 6 is a block diagram illustrating an example of a computing device or computing system upon which any of one or more techniques (e.g., methods) may be performed, in accordance with one or more example embodiments of the present disclosure.

FIG. 6 illustrates an embodiment of an exemplary system 600, in accordance with one or more example embodiments of the present disclosure.

In various embodiments, the computing system 600 may comprise or be implemented as part of an electronic device.

In some embodiments, the computing system 600 may be representative, for example, of a computer system that implements one or more components of FIG. 1.

The embodiments are not limited in this context. More generally, the computing system 600 is configured to implement all logic, systems, processes, logic flows, methods, equations, apparatuses, and functionality described herein and with reference to FIGS. 1-5.

The system 600 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 600 may have a single processor with one core or more than one processor. Note that the term "processor" refers to a processor with a single core or a processor package with multiple processor cores.

In at least one embodiment, the computing system 600 is representative of one or more components of FIG. 1. More generally, the computing system 600 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard 605 for mounting platform components. The motherboard 605 is a point-to-point interconnect platform that includes a processor 610, a processor 630 coupled via a point-to-point interconnects as an Ultra Path Interconnect (UPI), and an enhanced LCEVC presentation of tiles device 619. In other embodiments, the system 600 may be of another bus architecture, such as a multi-drop bus. Furthermore, each of processors 610 and 630 may be processor packages with multiple processor cores. As an example, processors 610 and 630 are shown to include processor core(s) 620 and 640, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 610 and the chipset 660. Some platforms may include additional components and some platforms may only include sockets to mount the processors and/or the chipset.

The processors 610 and 630 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 610, and 630.

The processor 610 includes an integrated memory controller (IMC) 614, registers 616, and point-to-point (P-P) interfaces 618 and 652. Similarly, the processor 630 includes an IMC 634, registers 636, and P-P interfaces 638 and 654. The IMC's 614 and 634 couple the processors 610 and 630, respectively, to respective memories, a memory 612 and a memory 632. The memories 612 and 632 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 612 and 632 locally attach to the respective processors 610 and 630.

In addition to the processors 610 and 630, the system 600 may include an enhanced LCEVC presentation of tiles device 619. The enhanced LCEVC presentation of tiles device 619 may be connected to chipset 660 by means of P-P interfaces 629 and 669. The enhanced LCEVC presentation of tiles device 619 may also be connected to a memory 639. In some embodiments, the enhanced LCEVC presentation of tiles device 619 may be connected to at least one of the processors 610 and 630. In other embodiments, the memories 612, 632, and 639 may couple with the processor 610 and 630, and the enhanced LCEVC presentation of tiles device 619 via a bus and shared memory hub.

System 600 includes chipset 660 coupled to processors 610 and 630. Furthermore, chipset 660 can be coupled to storage medium 603, for example, via an interface (I/F) 666. The I/F 666 may be, for example, a Peripheral Component Interconnect-enhanced (PCI-e). The processors 610, 630, and the enhanced LCEVC presentation of tiles device 619 may access the storage medium 603 through chipset 660.

Storage medium 603 may comprise any non-transitory computer-readable storage medium or machine-readable storage medium, such as an optical, magnetic or semiconductor storage medium. In various embodiments, storage medium 603 may comprise an article of manufacture. In some embodiments, storage medium 603 may store computer-executable instructions, such as computer-executable instructions 602 to implement one or more of processes or operations described herein, (e.g., process 500 of FIG. 5). The storage medium 603 may store computer-executable instructions for any equations depicted above. The storage medium 603 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 610 couples to a chipset 660 via P-P interfaces 652 and 662 and the processor 630 couples to a chipset 660 via P-P interfaces 654 and 664. Direct Media Interfaces (DMIs) may couple the P-P interfaces 652 and 662 and the P-P interfaces 654 and 664, respectively. The DMI may be a high-speed interconnect that facilitates, e.g., eight Giga Transfers per second (GT/s) such as DMI 3.0. In other embodiments, the processors 610 and 630 may interconnect via a bus.

The chipset 660 may comprise a controller hub such as a platform controller hub (PCH). The chipset 660 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 660 may comprise more than one controller hub such as a chipset with a memory controller hub, a graphics controller hub, and an input/output (I/O) controller hub.

In the present embodiment, the chipset 660 couples with a trusted platform module (TPM) 672 and the UEFI, BIOS, Flash component 674 via an interface (I/F) 670. The TPM 672 is a dedicated microcontroller designed to secure hardware by integrating cryptographic keys into devices. The UEFI, BIOS, Flash component 674 may provide pre-boot code.

Furthermore, chipset 660 includes the I/F 666 to couple chipset 660 with a high-performance graphics engine, graphics card 665. In other embodiments, the system 600 may include a flexible display interface (FDI) between the processors 610 and 630 and the chipset 660. The FDI interconnects a graphics processor core in a processor with the chipset 660.

Various I/O devices 692 couple to the bus 681, along with a bus bridge 680 which couples the bus 681 to a second bus 691 and an I/F 668 that connects the bus 681 with the chipset 660. In one embodiment, the second bus 691 may be a low pin count (LPC) bus. Various devices may couple to the second bus 691 including, for example, a keyboard 682, a mouse 684, communication devices 686, a storage medium 601, and an audio I/O 690.

The artificial intelligence (AI) accelerator 667 may be circuitry arranged to perform computations related to AI. The AI accelerator 667 may be connected to storage medium 603 and chipset 660. The AI accelerator 667 may deliver the processing power and energy efficiency needed to enable abundant-data computing. The AI accelerator 667 is a class of specialized hardware accelerators or computer systems designed to accelerate artificial intelligence and machine learning applications, including artificial neural networks and machine vision. The AI accelerator 667 may be applicable to algorithms for robotics, internet of things, other data-intensive and/or sensor-driven tasks.

Many of the I/O devices 692, communication devices 686, and the storage medium 601 may reside on the motherboard 605 while the keyboard 682 and the mouse 684 may be add-on peripherals. In other embodiments, some or all the I/O devices 692, communication devices 686, and the storage medium 601 are add-on peripherals and do not reside on the motherboard 605.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The following examples pertain to further embodiments.

Example 1 may include a system that comprises at least one memory that stores computer-executable instructions; and at least one processor configured to access the at least one memory and execute the computer-executable instructions to: encode video data into one or more bits while applying a low complexity enhancement video coding (LCEVC) organizational syntax; generate a bitstream of the one or more bits based on the LCEVC organizational syntax; assign a payload type value to the bitstream, wherein the payload type value indicates the LCEVC organizational syntax has been applied to the one or more bits; and transmit the bitstream to a device comprising a decoder.

Example 2 may include the system of example 1 and/or some other example herein, wherein the LCEVC organizational syntax may be applied to frame rates of 4 Kp60, 8K, or 12K.

Example 3 may include the system of example 1 and/or some other example herein, wherein the LCEVC organizational syntax may be based on a tile index of a video frame.

Example 4 may include the system of example 1 and/or some other example herein, wherein the LCEVC organizational syntax results in tile data of a video frame to be accessed without being based on Y/U/V planes.

Example 5 may include the system of example 1 and/or some other example herein, wherein payload type value indicates to decoder of the device that the bitstream may be associated with the LCEVC organizational syntax.

Example 6 may include the system of example 1 and/or some other example herein, wherein tile data comprises Y/U/V planes data.

Example 7 may include the system of example 1 and/or some other example herein, wherein the bitstream may be comprised of a first enhancement sublayer data that comprises a plurality of tile encoded data, wherein each tile encoded data comprises data associated with Y plane data, U plane data, and V plane data.

Example 8 may include the system of example 1 and/or some other example herein, wherein each plane data comprises coefficient group data.

Example 9 may include a non-transitory computer-readable medium storing computer-executable instructions which when executed by one or more processors result in performing operations comprising: encoding video data into one or more bits while applying a low complexity enhancement video coding (LCEVC) organizational syntax; generating a bitstream of the one or more bits based on the LCEVC organizational syntax; assigning a payload type value to the bitstream, wherein the payload type value indicates the LCEVC organizational syntax has been applied to the one or more bits; and transmitting the bitstream to a device comprising a decoder.

Example 10 may include the non-transitory computer-readable medium of example 9 and/or some other example herein, wherein the LCEVC organizational syntax may be applied to frame rates of 4 Kp60, 8K, or 12K.

Example 11 may include the non-transitory computer-readable medium of example 9 and/or some other example herein, wherein the LCEVC organizational syntax may be based on a tile index of a video frame.

Example 12 may include the non-transitory computer-readable medium of example 9 and/or some other example herein, wherein the LCEVC organizational syntax results in tile data of a video frame to be accessed without being based on Y/U/V planes.

Example 13 may include the non-transitory computer-readable medium of example 9 and/or some other example herein, wherein payload type value indicates to decoder of the device that the bitstream may be associated with the LCEVC organizational syntax.

Example 14 may include the non-transitory computer-readable medium of example 9 and/or some other example herein, wherein tile data comprises Y/U/V planes data.

Example 15 may include the non-transitory computer-readable medium of example 9 and/or some other example herein, wherein the bitstream may be comprised of a first enhancement sublayer data that comprises a plurality of tile encoded data, wherein each tile encoded data comprises data associated with Y plane data, U plane data, and V plane data.

Example 16 may include the non-transitory computer-readable medium of example 9 and/or some other example herein, wherein each plane data comprises coefficient group data.

Example 17 may include a method comprising: encoding video data into one or more bits while applying a low complexity enhancement video coding (LCEVC) organizational syntax; generating a bitstream of the one or more bits based on the LCEVC organizational syntax; assigning a payload type value to the bitstream, wherein the payload type value indicates the LCEVC organizational syntax has been applied to the one or more bits; and transmitting the bitstream to a device comprising a decoder.

Example 18 may include the method of example 17 and/or some other example herein, wherein the LCEVC organizational syntax may be applied to frame rates of 4 Kp60, 8K, or 12K.

Example 19 may include the method of example 17 and/or some other example herein, wherein the LCEVC organizational syntax may be based on a tile index of a video frame.

Example 20 may include the method of example 17 and/or some other example herein, wherein the LCEVC organizational syntax results in tile data of a video frame to be accessed without being based on Y/U/V planes.

Example 21 may include the method of example 17 and/or some other example herein, wherein payload type value indicates to decoder of the device that the bitstream may be associated with the LCEVC organizational syntax.

Example 22 may include the method of example 17 and/or some other example herein, wherein tile data comprises Y/U/V planes data.

Example 23 may include the method of example 17 and/or some other example herein, wherein the bitstream may be comprised of a first enhancement sublayer data that comprises a plurality of tile encoded data, wherein each tile encoded data comprises data associated with Y plane data, U plane data, and V plane data.

Example 24 may include the method of example 17 and/or some other example herein, wherein each plane data comprises coefficient group data.

Example 25 may include an apparatus comprising means for: encoding video data into one or more bits while applying a low complexity enhancement video coding (LCEVC) organizational syntax; generating a bitstream of the one or more bits based on the LCEVC organizational syntax; assigning a payload type value to the bitstream, wherein the payload type value indicates the LCEVC organizational syntax has been applied to the one or more bits; and transmitting the bitstream to a device comprising a decoder.

Example 26 may include the apparatus of example 25 and/or some other example herein, wherein the LCEVC organizational syntax may be applied to frame rates of 4 Kp60, 8K, or 12K.

Example 27 may include the apparatus of example 25 and/or some other example herein, wherein the LCEVC organizational syntax may be based on a tile index of a video frame.

Example 28 may include the apparatus of example 25 and/or some other example herein, wherein the LCEVC organizational syntax results in tile data of a video frame to be accessed without being based on Y/U/V planes.

Example 29 may include the apparatus of example 25 and/or some other example herein, wherein payload type value indicates to decoder of the device that the bitstream may be associated with the LCEVC organizational syntax.

Example 30 may include the apparatus of example 25 and/or some other example herein, wherein tile data comprises Y/U/V planes data.

Example 31 may include the apparatus of example 25 and/or some other example herein, wherein the bitstream may be comprised of a first enhancement sublayer data that comprises a plurality of tile encoded data, wherein each tile encoded data comprises data associated with Y plane data, U plane data, and V plane data.

Example 32 may include the apparatus of example 25 and/or some other example herein, wherein each plane data comprises coefficient group data.

Example 33 may include one or more non-transitory computer-readable media comprising instructions to cause an electronic device, upon execution of the instructions by one or more processors of the electronic device, to perform one or more elements of a method described in or related to any of examples 1-32, or any other method or process described herein Example 34 may include an apparatus comprising logic, modules, and/or circuitry to perform one or more elements of a method described in or related to any of examples 1-32, or any other method or process described herein.

Example 35 may include a method, technique, or process as described in or related to any of examples 1-32, or portions or parts thereof.

Example 36 may include an apparatus comprising: one or more processors and one or more computer readable media comprising instructions that, when executed by the one or more processors, cause the one or more processors to perform the method, techniques, or process as described in or related to any of examples 1-32, or portions thereof.

Example 37 may include a method of communicating in a wireless network as shown and described herein.

Example 38 may include a system for providing wireless communication as shown and described herein.

Example 39 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system comprising:

at least one memory;

computer-executable instructions; and at least one processor circuit to be programmed based on the computer-executable instructions to:

organize encoded frame data into a bitstream based on a low complexity enhancement video coding (LCEVC) syntax, the LCEVC syntax to cause first luma plane data and first chroma plane data of a first tile associated with a residual level of the encoded frame data to be included consecutively in a first group of bits of the bitstream, and to cause second luma plane data and second chroma plane data of a second tile associated with the residual level of the encoded frame data to be included consecutively in a second group of bits of the bitstream, the second group of bits after the first group of bits;

assign a payload type value to the bitstream, the payload type value to indicate the bitstream is organized based on the LCEVC syntax; and cause transmission of the bitstream to a device.

2. The system of claim 1, wherein the LCEVC syntax is applicable to frame rates including at least one of 4Kp60, 8K, or 12K.

3. The system of claim 1, wherein the LCEVC syntax is based on a tile index of a video frame.

4. The system of claim 1, wherein the LCEVC syntax permits tile data of a video frame to be accessed without identification of a particular luma or chroma plane.

5. The system of claim 1, wherein the first luma plane data of the first tile corresponds to Y plane data, the first chroma plane data of the first tile includes U plane data and V plane data, and the LCEVC syntax to cause the Y plane data, the U plane data and the V plane data for the first tile to be included consecutively in the first group of bits of the bitstream.

6. The system of claim 1, wherein the residual level corresponds to a first enhancement sublayer of the encoded frame data.

7. The system of claim 5, wherein the Y plane data, the U plane data, and the V plane data include respective coefficient group data.

8. A non-transitory computer-readable medium comprising computer-executable instructions to cause at least one processor circuit to at least:

organize encoded frame data into a bitstream based on a low complexity enhancement video coding (LCEVC) syntax, the LCEVC syntax to cause first luma plane data and first chroma plane data of a first tile associated with a residual level of the encoded frame data to be included consecutively in a first group of bits of the bitstream, and to cause second luma plane data and second chroma plane data of a second tile associated with the residual level of the encoded frame data to be included consecutively in a second group of bits of the bitstream, the second group of bits after the first group of bits;

assign a payload type value to the bitstream, the payload type value to indicate the bitstream is organized based on the LCEVC syntax; and cause transmission of the bitstream to a device.

9. The non-transitory computer-readable medium of claim 8, wherein the LCEVC syntax is applicable to frame rates including at least one of 4Kp60, 8K, or 12K.

10. The non-transitory computer-readable medium of claim 8, wherein the LCEVC syntax is based on a tile index of a video frame.

11. The non-transitory computer-readable medium of claim 8, wherein the LCEVC syntax permits tile data of a video frame to be accessed without identification of a particular luma or chroma plane.

12. The non-transitory computer-readable medium of claim 8, wherein the first luma plane data of the first tile corresponds to Y plane data, the first chroma plane data of the first tile includes U plane data and V plane data, and the LCEVC syntax to cause the Y plane data, the U plane data and the V plane data for the first tile to be included consecutively in the first group of bits of the bitstream.

13. The non-transitory computer-readable medium of claim 8, wherein the residual level corresponds to a first enhancement sublayer of the encoded frame data.

14. The non-transitory computer-readable medium of claim 12, wherein the Y plane data, the U plane data, and the V plane data include respective coefficient group data.

15. A method comprising:

organizing encoded frame data into a bitstream based on a low complexity enhancement video coding (LCEVC) syntax, the LCEVC syntax to cause first luma plane data and first chroma plane data of a first tile associated with a residual level of the encoded frame data to be included consecutively in a first group of bits of the bitstream, and to cause second luma plane data and second chroma plane data of a second tile associated with the residual level of the encoded frame data to be included consecutively in a second group of bits of the bitstream, the second group of bits after the first group of bits;

assigning a payload type value to the bitstream, the payload type value indicating the bitstream is organized based on the LCEVC syntax; and transmitting the bitstream to a device.

16. The method of claim 15, wherein the LCEVC syntax is applicable to frame rates including at least one of 4Kp60, 8K, or 12K.

17. The method of claim 15, wherein the LCEVC syntax is based on a tile index of a video frame.

18. The method of claim 15, wherein the LCEVC syntax permits tile data of a video frame to be accessed without identification of a particular luma or chroma plane.

19. The system of claim 1, wherein the residual level is a first residual level, and the LCEVC syntax is to cause third luma plane data and third chroma plane data associated with a second residual level of the first tile to be included consecutively in a third group of bits of the bitstream, the third group of bits after the second group of bits, and to cause fourth luma plane data and fourth chroma plane data associated with the second residual level of the second tile to be included consecutively in a fourth group of bits of the bitstream, the fourth group of bits after the third group of bits.

20. The non-transitory computer-readable medium of claim 8, wherein the residual level is a first residual level, and the LCEVC syntax is to cause third luma plane data and third chroma plane data associated with a second residual level of the first tile to be included consecutively in a third group of bits of the bitstream, the third group of bits after the second group of bits, and to cause fourth luma plane data and fourth chroma plane data associated with the second residual level of the second tile to be included consecutively in a fourth group of bits of the bitstream, the fourth group of bits after the third group of bits.

* * * * *